United States Patent [19]

Ward et al.

[11] Patent Number: 4,806,939

[45] Date of Patent: Feb. 21, 1989

[54] OPTIMIZATION OF CONVERGENCE OF SEQUENTIAL DECORRELATOR

[75] Inventors: Christopher R. Ward, Bishops Stortford; Anthony J. Robson, Water Beach, both of England

[73] Assignee: STC, PLC, London, England

[21] Appl. No.: 815,046

[22] Filed: Dec. 31, 1985

[30] Foreign Application Priority Data

Jan. 4, 1985 [GB] United Kingdom ................. 8500147

[51] Int. Cl.⁴ ................................................. G01S 3/28

[52] U.S. Cl. ..................................... 342/378; 342/379

[58] Field of Search ......................... 342/370, 378–384, 342/379, 3

[56] References Cited

U.S. PATENT DOCUMENTS

| | | | |
|---|---|---|---|
| 2,575,340 | 11/1951 | Goldstein | 342/374 |
| 3,876,947 | 4/1975 | Giroudon | 342/383 |
| 4,005,426 | 1/1977 | White | 342/378 |
| 4,203,114 | 5/1980 | Gerst et al. | 342/373 |
| 4,425,567 | 1/1984 | Tresselt | 342/373 |
| 4,498,083 | 2/1985 | Gutlebes | 342/383 |
| 4,625,211 | 11/1986 | Searle et al. | 342/378 |
| 4,688,187 | 8/1987 | McWhirter | 342/381 X |

FOREIGN PATENT DOCUMENTS

| | | | |
|---|---|---|---|
| 59-44104 | 12/1984 | Japan | 342/374 |

*Primary Examiner*—Theodore M. Blum
*Assistant Examiner*—Mark Hellner
*Attorney, Agent, or Firm*—Dennis P. Clarke

[57] ABSTRACT

A sequential decorrelator arrangement for an adaptive antenna array comprising a plurality of antenna elements the outputs of which feed a cascaded beamforming network having a succession of stages, each stage having one less decorrelation cell than the preceding stage and the first stage having one less cell than the number of antenna elements.

The network includes means for applying weighting to the signals applied as inputs to the cells of at least the first stage. The decorrelation cells in each stage comprise means for applying simple rotational transforms to the input data in accordance with a weighting factor common to all the cells in a stage, each stage further including means for deriving said weighting factor from the weighting factor deriving means of the previous stage and the output of one cell of the preceding stage. Each stage includes means for scaling the output of each cell in the stage by a scaling factor calculated from the weighting factor deriving means of the stage.

2 Claims, 6 Drawing Sheets

BOUNDARY NODE $$V(k+1) = (V^2(k) + [X(k+1)]^2]$$

$$C_{out}(k+1) = \frac{V(k)}{V(k+1)}$$

$$S_{out}(k+1) = \frac{X(k+1)}{V(k+1)}$$

$$Y_{out}(k+1) = Y_{in}(k+1) \cdot C_{out}(k+1)$$

INTERNAL NODE $$R_1(k+1) = C_{in}(k+1)R_1(k) + S_{in}(k+1)Y_{in}(k+1)$$

$$Y_{out}(k+1) = C_{in}(k+1)\ Y_{in}(k+1) - S_{in}(k+1)\ R_1(k)$$

$$C_{out}(k+1) = C_{in}(k+1)$$

$$S_{out}(k+1) = S_{in}(k+1)$$

OPTIMIZATION OF CONVERGENCE OF SEQUENTIAL DECORRELATOR

BACKGROUND OF THE INVENTION

This invention relates to sequential decorrelator arrangements such as are used in adaptive antenna arrays to perform beamforming operations.

Adaptive beamforming provides a powerful means of enhancing the performance of a broad range of communication, navigation and radar systems in hostile electromagnetic environments. In essence, adaptive arrays are antenna systems which can automatically adjust their directional response to null interference or jamming and thus enhance the reception of wanted signals. In many applications, antenna platform dynamics, sophisticated jamming threats and agile waveform structures produce a requirement for adaptive systems having rapid convergence, high cancellation performance and operational flexibility.

In recent years, there has been considerable interest in the application of direct solution or "open loop" techniques to adaptive antenna processing in order to accommodate these increasing demands. In the context of adaptive antenna processing these algorithms have the advantage of requiring only limited input data to accurately describe the external environment and provide an antenna pattern capable of suppressing a wide dynamic range of jamming signals.

The objective of an optimal adaptive antenna system is to minimise the total noise residue (including jamming and receiver noise) at the array output whilst maintaining a fixed gain in the direction of the desired signal and hence lead to a maximisation of resultant signal to noise ratio.

DESCRIPTION OF RELATED ART

One way of implementing an adaptive beamforming algorithm is by the use of the so-called "sequential decorrelator". British Pat. No. 1,599,035 describes a sequential decorrelator using open loop decorrelation stages. FIGS. 1 and 2 of the present specification illustrate a 5 element network and a simplified representation of the open loop decorrelation cell respectively. Only in the steady-state, in the limit of an infinite time average, will this network provide an effective weight transformation to the input data identical to the "optimal" least-squares solution as defined below. The convergence characteristics of the Sequential Decorrelator as described in U.S. Pat. No. 1,599,035 differ significantly from the required least-squares solution if the network is operated "on the fly" with data samples continuously applied to the processor. Optimal convergence will only be obtained by re-cycling input data through to network and by updating the decorrelation weights on a rank by rank basis. This mode of operation obviously detracts from real-time application.

Each decorrelation cell adaptively combines the applied signals as shown by FIG. 2. The decorrelation weight is derived from the ratio of Maximum Likelihood estimates of the cross- and auto-correlation of the input signals. Hence, we have $$W = -\frac{U(k)}{V^2(k)} \qquad (2)$$

where $$U(k) = \sum_{i=1}^{k} x_i^* y_i \qquad (3)$$

and $$V(k) = \left\{ \sum_{i=1}^{k} x_i^* x_i \right\}^{\frac{1}{2}}$$

Since the $V^2(k)$ factor is used by all decorrelation stages within a particular rank, then autocorrelation estimates in fact can be calculated by a separate processing stage as shown by FIG. 3. FIGS. 4*a*–4*d* show schematic diagrams of the different processing stages for the standard sequential decorrelator. FIG. 4*b* is a detailed expansion of the simple schematic stage shown in FIG. 4*a* and FIG. 4*d* is a detailed expansion of the simple schematic shown in FIG. 4*c*. Note that in FIG. 4*d* the box labelled "half complex multiply" multiplies a coupler number U(k) by a real number D.

SUMMARY OF THE INVENTION

According to the present invention there is provided a sequential decorrelator arrangement for an adaptive antenna array comprising a plurality of antenna elements the outputs of which feed a cascaded beamforming network having a succession of stages, each stage including a group of signal decorrelation cells, the group in each stage having one less cell than the group of the preceding stage and the first stage group having one less cell than the number of antenna elements, each cell of the first stage having as one input the output of a respective antenna element and as a second input the output of the remaining antenna element to produce an output signal and each cell of each subsequent stage having as one input the output of a respective cell of the preceding stage and as a second input the output from the remaining cell of the preceding stage to produce an output signal, the whole arrangement including means for applying weighting to the signals applied as inputs to the cells of at least the first stage, characterised in that the decorrelation cells in each stage comprise means for applying simple transforms to the input data in accordance with a weighting factor common to all the cells in a stage, each stage further including means for deriving said weighting factor from the weighting factor deriving means of the previous stage and the output of one cell of the preceding stage, and each stage including means for scaling the output of each cell in the stage by a scaling factor calculated from the weighting factor deriving means of the stage.

BRIEF DESCRIPTION OF THE DRAWINGS

Embodiments of the invention will now be described with reference to the accompanying drawings, in which.

DESCRIPTION OF THE PREFERRED EMBODIMENTS

Figure 5:
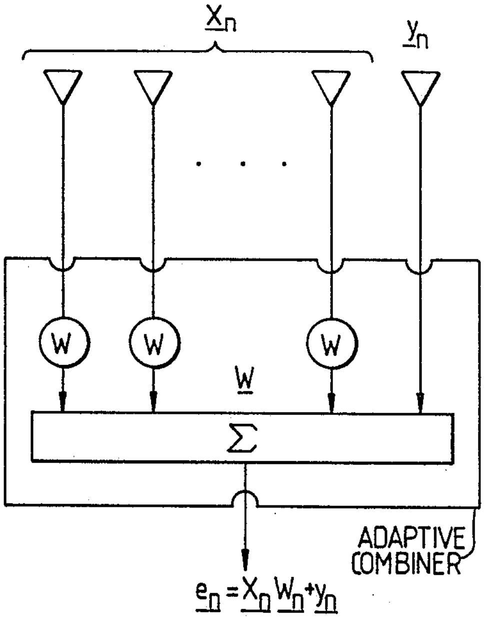
FIG. 5 illustrates a basic adaptive antenna array.

Referring to FIG. 5, the vector of residuals from the array is given by:

$$e_n = X_n w_n + y_n \tag{1}$$

The "optimal" adaptive control law is defined as the weight solution which minimizes the norm of the residual vector, $e_n$. Since the quantity $e_n^H e_n$ is representative of the best estimate of the output power from the array after n data snapshots, the weight set which minimizes the norm of $e_n$ will in fact be the Maximum Likelihood estimate of the weight solution which minimizes the output power from the array.

The optimal solution can be derived by the least-squares, QR processing algorithm. This technique performs a triangularization of the data matrix, $X_n$using a sequence of pipelined Givens rotations and then involves a back substitution process to solve for the weight set $w_n$. Kung, H. T. and Gentleman, W. M., "Matrix Triangularization by Systolic Arrays", Proc. SPIE, Vol. 298, Real-Time Signal Processing IV, 1981, have recently shown how a pair of processing arrays may be used to implement the triangularization stage and then provide back-substitution. McWhirter, J. G., "Recursive Least-Squares Minimization using a Systolic Array", Proc. SPIE, Vol. 431, Real-Time Signal Processing VI, 1983, has described a modified version of Kung and Gentleman's QR processing array in which the least-squares residual is produced quite simply and directly at every stage without solving the corresponding triangular linear system. An analogy with this enhanced processing array is used to demonstrate how the Sequential Decorrelator as described originally by British Pat. No. 1,599,035 can be modified to provide an adaptive performance identical to the least-squares control law defined above.

Figure 6:
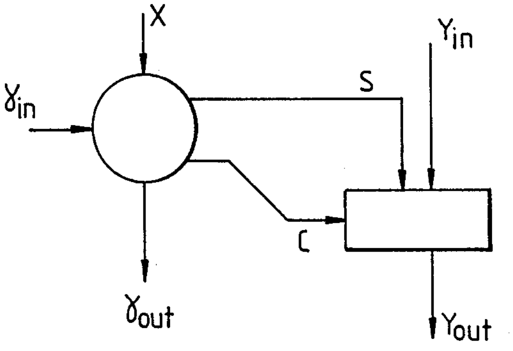
FIG. 6 illustrates a decorrelation stage for a QR algorithm.

A decorrelation cell can be constructed with the QR algorithm and is shown by FIG. 6. It consists of two essential processing nodes; (i) the boundary stage, which computes the "rotation coefficients", and (ii) the internal processor, which performs the rotational transform. The terms V(k) and U(k) are effectively stored within the two processing stages and are resultant from the previous rotation.

Using the previous notation we define $$U(k) = \sum_{i=1}^{k} \{x_i^*(i)\, y(i)\} \tag{3}$$

and $$V(k) = \left\{ \sum_{i=1}^{k} |x_i(i)|^2 \right\}^{\frac{1}{2}}$$

When the samples, x(k+1) and y(k+1) are applied to the cell, a new transformation is computed whereby $$\begin{bmatrix} c & s^* \\ -s & c \end{bmatrix} \begin{bmatrix} V(k) & U(k)/V(k) \\ x(k+1) & y(k+1) \end{bmatrix} = \begin{bmatrix} A & B \\ O & \alpha(k+1) \end{bmatrix} \tag{4}$$

Now, the coefficients c and s denoting the rotation transform are:

$$C = \frac{V(k)}{\sqrt{V^2(k) + |x(k+1)|^2}} = \frac{V(k)}{V(k+1)} \tag{5}$$

and $$S = \frac{x\,(k+1+}{\sqrt{V^2(k) + |x(k+1)|^2}} = \frac{x(k+1)}{V(k+1)}$$

This therefore gives for the resultant factors A and B and $$\begin{aligned} A &= c\,V(k) + s^*x(k+1) \\ &= \frac{V(k)\,V(k)}{V(k+1)} + \frac{x^*(k+1)\,x(k+1)}{V(k+1)} \\ &= V(k+1) \end{aligned}$$

and $$\begin{aligned} B &= \frac{c\,U(k)}{V(k)} + s^*y(k+1) \\ &= \frac{V(k)}{V(k+1)} \cdot \frac{U(k)}{V(k)} + \frac{x^*(k+1)}{V(k+1)}\,y(k+1) \\ &= \frac{U(k+1)}{V(k+1)} \end{aligned} \tag{7}$$

The important term of the transformed matrix described by equation (4) is α since this will be an integral part of the required output from the decorrelation cell. Therefore, computing α gives:

$$\alpha(k+1) = -S\frac{U(k)}{V(k)} + c\,y(k+1) \tag{8}$$

and substituting for coefficients C and S gives $$\alpha(k+1) = \frac{V^2(k)\,y(k+1) - U(k)\,x(k+1)}{V(k)\,V(k+1)} \tag{9}$$

Now $$U(k) = U(k+1) - x^*(k+1)y(k+1) \tag{10}$$

so that $$\alpha(k+1) = \frac{V^2(k)\,y(k+1) + x^*(k+1)\,x(k+1)\,y(k+1) - U(k+1)\,x(k+1)}{V(k)\,V(k+1)} \tag{11}$$

This can be reduced to:

$$\alpha(k+1) = \frac{V^2(k+1)\,y(k+1) - U(k+1)\,x(k+1)}{V(k)\,V(k+1)} \tag{12}$$

Choosing $\gamma = c = V(k)/V(k+1)$ then gives $$(k+1)\cdot(k+1) = .c = y(k+1) - \frac{U(k+1)}{V^2(k+1)}\cdot x(k+1) \quad (13)$$

The product $\alpha\cdot\gamma$ is therefore equivalent to a "beamformed" output:

$$y!(k+1) = \alpha\cdot\gamma = y(k+1) = W\cdot x(k+1)$$

with the weight value given by:

$$W = \frac{-U(k+1)}{V^2(k+1)} = \frac{-\sum_{i=1}^{k+1} x^*(i)\,y(i)}{\sum_{i=1}^{k+1} x^*(i)\,x(i)} \quad (14)$$

It should be noted that this result corresponds exactly to that for the 'conventional' decorrelation cell where the weight coefficient is computed from the quotient of recursively updated cross- and auto-covariance estimates.

Figure 1:
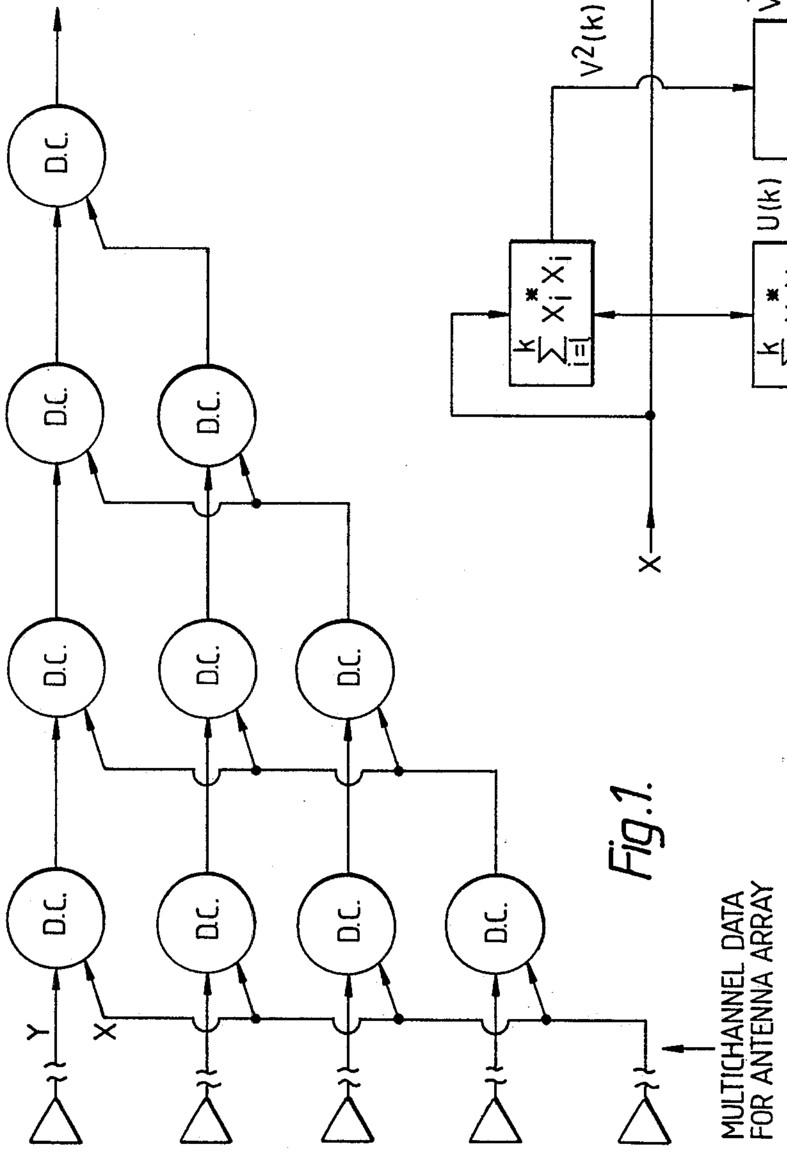
FIG. 1 illustrates a known sequential decorrelator.
Figure 2:
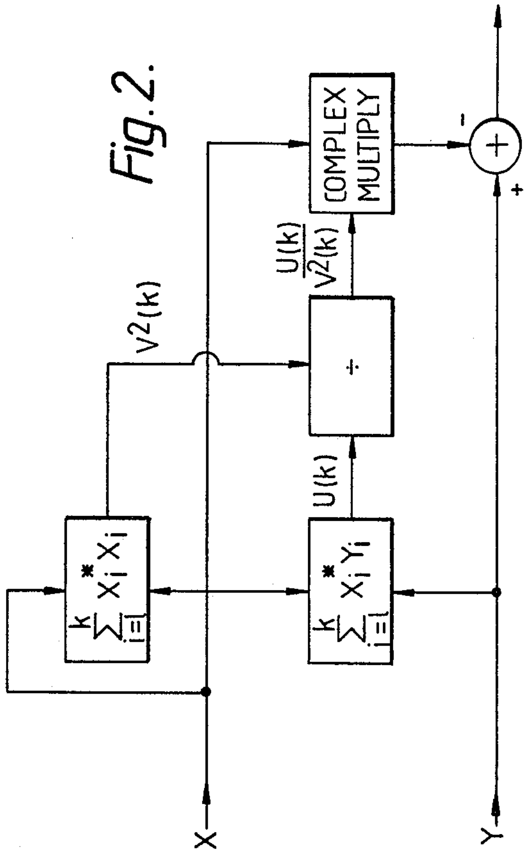
FIG. 2 illustrates a simplified representation of a known decorrelation cell.
Figure 3:
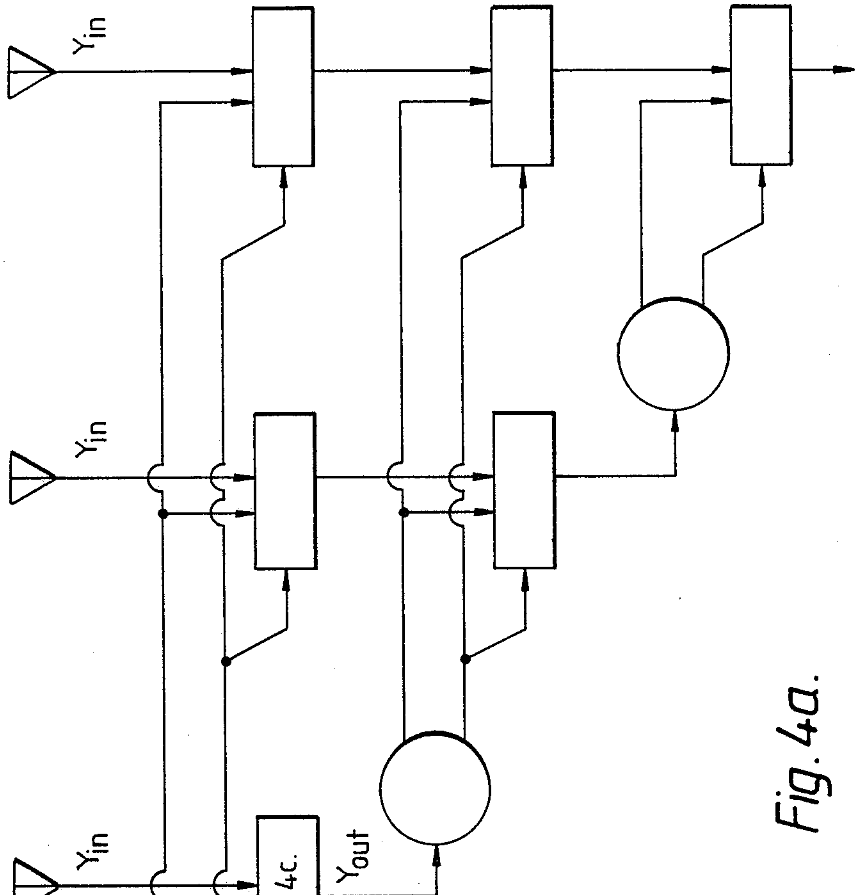
FIG. 3 illustrates a parallel architecture for a standard sequential decorrelator.
Figure 4A:
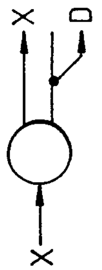
FIGS. 4*a*–4*d* illustrate processing stages for a sequential decorrelator.
Figure 4B:
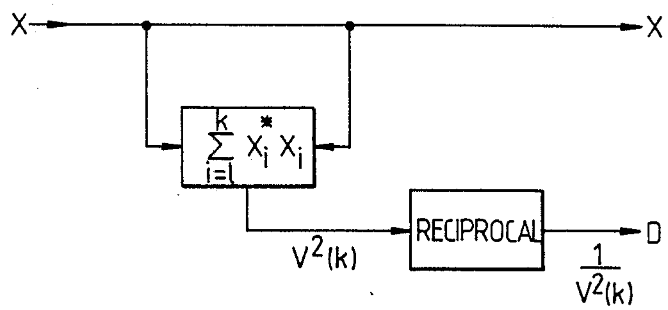
Figure 4C:
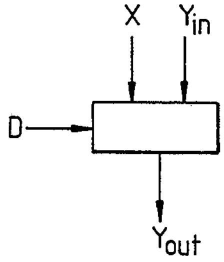
Figure 4D:
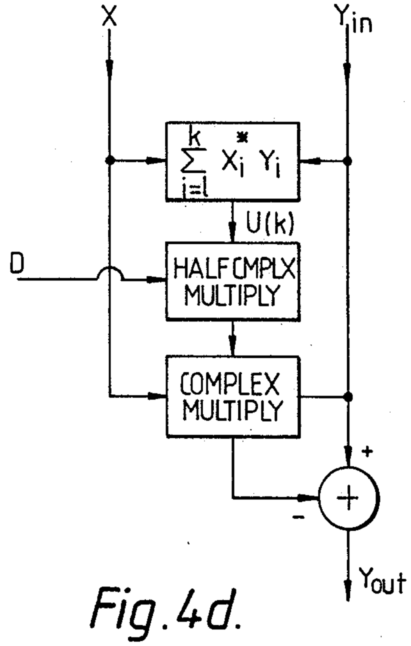
Figure 7:
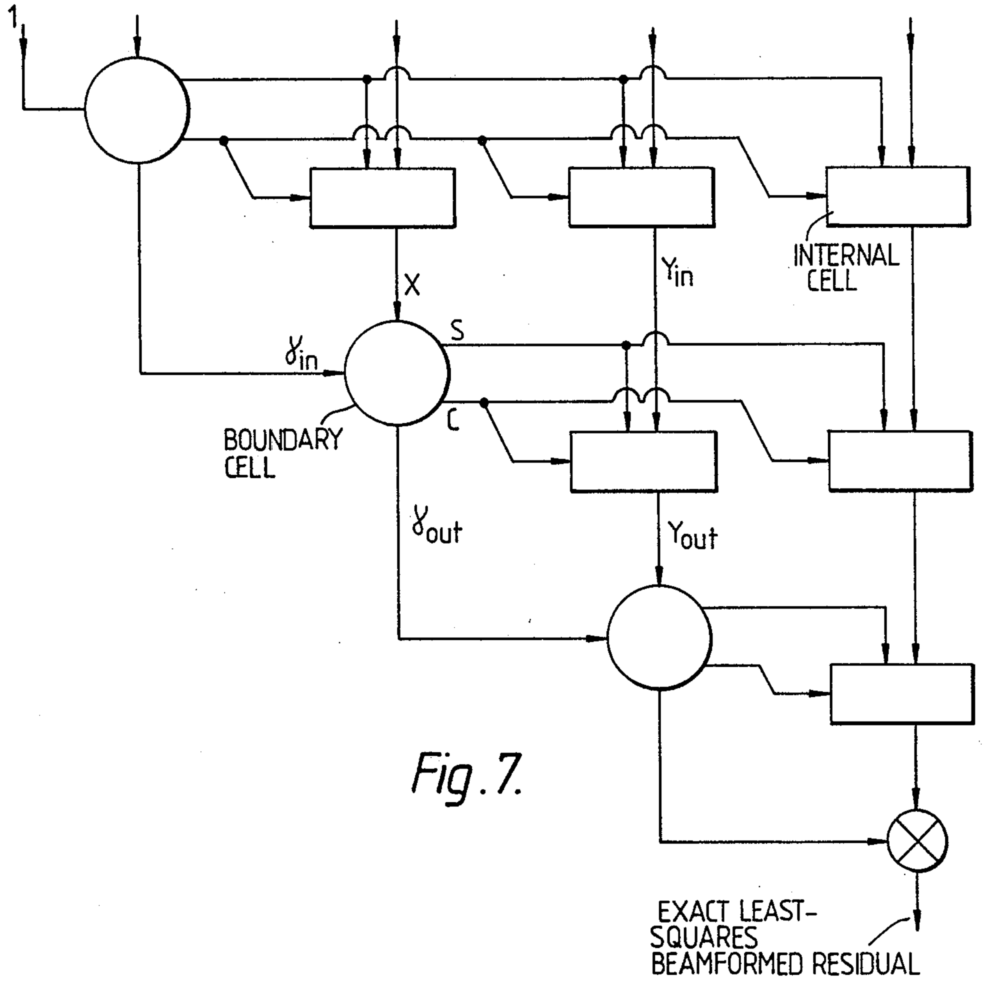
FIG. 7 illustrates obtaining the Least Squares Residual using the QR algorithm.
Figure 8A:
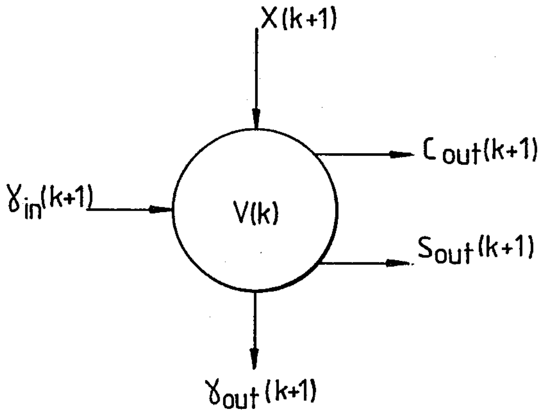
FIGS. 8a–8b illustrate processing nodes for the standard QR algorithm.
Figure 8B:
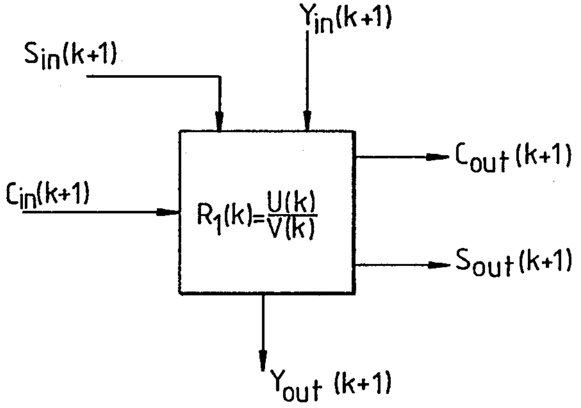
Figure 9:
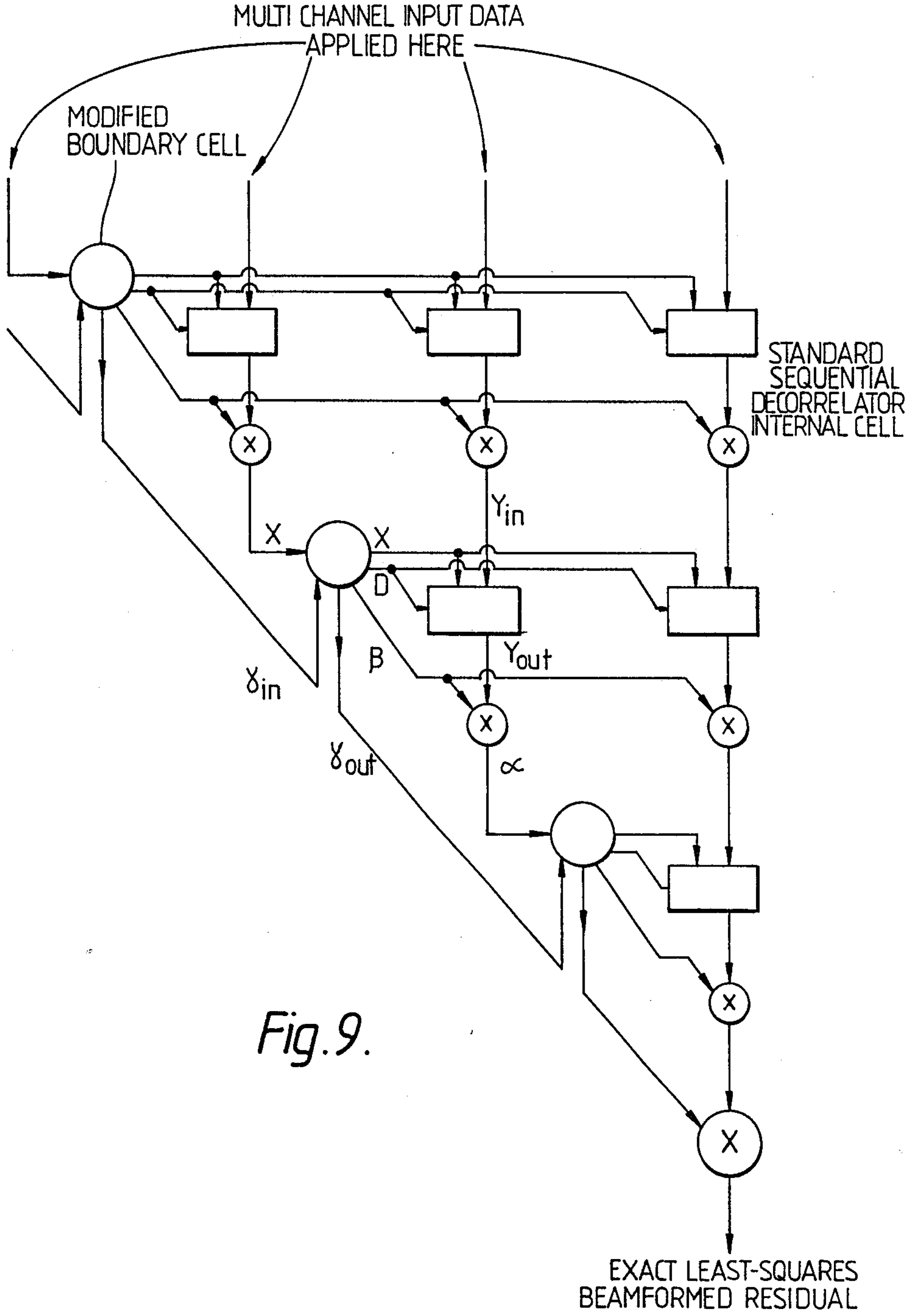
FIG. 9 illustrates the structure of a sequential decorrelator according to the invention.

Previous work by McWhirter has shown how a number of these decorrelation stages (based on the QR algorithm) can be cascaded to form an arbitrary N element decorrelation network. A 4 element example is shown by FIG. 7 with corresponding cell descriptions given by FIGS. 8*a*, 8*b*. Since the stored components in the networks shown by FIGS. 3 and 7 are essentially identical, the standard Sequential Decorrelator can be modified to provide the optimal least squares performance, as shown by FIG. 9. In this diagram we note that:

(i) the output from each internal (rectangular) stage is scaled to provide the $\alpha$ factor as produced by the optimal QR architecture. The scaling factor, $\beta$ is calculated in the boundary (circular) stage.

(ii) the boundary stage is further modified to derive the producted $\gamma$ factors transferred along the diagonal edge of the network.

from equation (12) we have that $$\alpha(k+1) = \frac{V(k+1)}{V(k)}\cdot\left[y(k+1) - \frac{U(k+1)}{V^2(k+1)}\,x(k+1)\right] \quad (15)$$

Therefore, the scaling factor, $\beta$, is $$\beta = \frac{V(k+1)}{V(k)} \quad (16)$$

$\beta$ is then the reciprocal of the c coefficient derived in the QR decorrelation cell. The $\gamma$ factor required for transfer along the diagonal boundary in the modified network is equal to the c coefficient.

Figure 10:
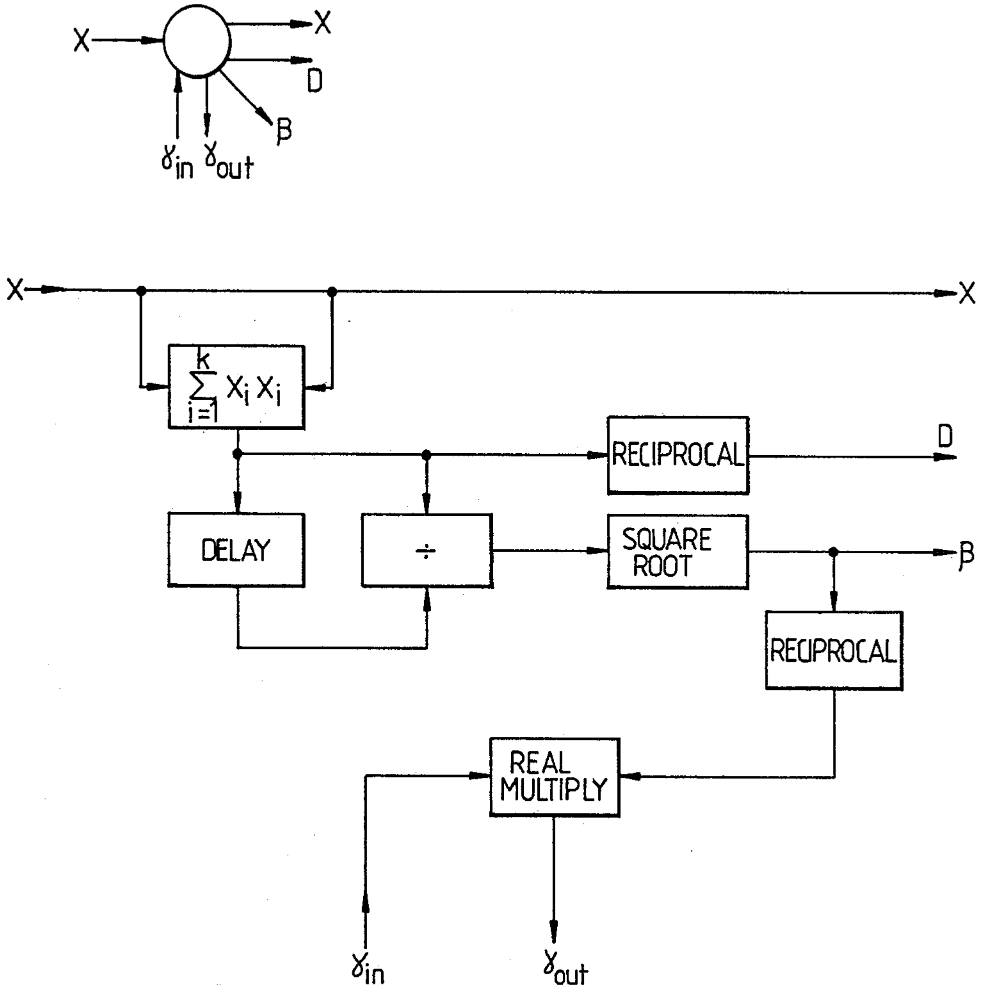
FIG. 10 illustrates a boundary processing stage to the sequential decorrelator of FIG. 9.

A schematic diagram detailing the internal operation of the boundary stage of the modified network is shown by FIG. 10.

We claim:

1. A sequential decorrelator arrangement for an adaptive antenna array comprising a plurality of antenna elements the outputs of which feed a cascaded beamforming network having a succession of stages, each stage including a group of signal decorrelation internal cells, the group in each stage having one less internal cell than the group of the preceding stage and the first stage group having one less internal cell than the number of antenna elements, each internal cell of the first stage having as one input the output of a respective antenna element and as a second input the output of the remaining antenna element to produce an output signal and each internal cell of each subsequent stage having as one input the output of a respective internal cell of the preceding stage and as a second input the output from the remaining internal cell of the preceding stage to produce an output signal, the whole arrangement including means for applying weighting to the signals applied as inputs to the internal cells of at least the first stage, wherein the decorrelation cells in each stage comprise means for applying simple transforms to the input data in accordance with a weighting factor common to all the internal cells in a stage, each stage further including a boundary cell for deriving said weighting factor from the weighting factor deriving boundary cell of the previous stage and the output of one internal cells of the preceding stage, and each stage including means for scaling the output of each internal cell in the deriving stage by a scaling factor calculated from the weighting factor boundary cell of the stage such that the network forms an exact least squares residual of the input signals.

2. A method of sequentially decorrelating by the least squares or processing algorithm signals received from an antenna array using cascaded stages of internal decorrelation cells in which each internal cell decorrelates the output of two internal cells of the preceding stage by applying rotational transforms thereto in accordance with a weighting factor common to all the cells in s stage, the weighting factor for each stage being derived in a boundary cell from the weighting factor of the preceding stage modified by the output of one internal cell of said preceding stage, wherein the method includes the application of scaling factors for scaling the output of each internal cell in a stage, said scaling factor being calculated from the weighting factor for the stage.

* * * * *